United States Patent
Toso et al.

(10) Patent No.: US 9,122,217 B2
(45) Date of Patent: Sep. 1, 2015

(54) IMAGE FORMING APPARATUS AND IMAGE NOISE PREDICTION METHOD

(71) Applicant: KONICA MINOLTA, INC., Chiyoda-ku (JP)

(72) Inventors: Yoshiyuki Toso, Aichi-ken (JP); Hiroyuki Maeda, Toyokawa (JP); Tadayasu Sekioka, Toyohashi (JP); Naotoshi Kawai, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/447,823

(22) Filed: Jul. 31, 2014

(65) Prior Publication Data

US 2015/0055964 A1   Feb. 26, 2015

(30) Foreign Application Priority Data

Aug. 20, 2013   (JP) .................................. 2013-170149

(51) Int. Cl.
   *G03G 15/00* (2006.01)
   *H04N 1/409* (2006.01)
(52) U.S. Cl.
   CPC ........... *G03G 15/5062* (2013.01); *H04N 1/409* (2013.01)
(58) Field of Classification Search
   CPC ........................... G03G 15/5062; H04N 1/409
   See application file for complete search history.

(56) References Cited

U.S. PATENT DOCUMENTS

| 2008/0291289 A1 | 11/2008 | Kurane |
| 2009/0319827 A1 | 12/2009 | Nakazato et al. |
| 2012/0250098 A1 | 10/2012 | Ikeda |

FOREIGN PATENT DOCUMENTS

| JP | 60-247659 A | 12/1985 |
| JP | 2005-205682 | 8/2005 |
| JP | 2005-205686 A | 8/2005 |
| JP | 2005-266244 A | 9/2005 |
| JP | 2008-003018 A | 1/2008 |
| JP | 2008-014728 A | 1/2008 |
| JP | 2008-236726 A | 10/2008 |
| JP | 451649 B2 | 10/2010 |
| JP | 4561649 B2 | 10/2010 |
| JP | 2010-268332 A | 11/2010 |
| JP | 2011-137895 A | 7/2011 |
| JP | 2012-203279 A | 10/2012 |

OTHER PUBLICATIONS

European Search Report issued in corresponding European Patent Application No. 14179824.9, dated Jul. 7, 2015. (7 pages).

*Primary Examiner* — Francis Gray

(74) *Attorney, Agent, or Firm* — Buchanan Ingersoll & Rooney PC

(57) ABSTRACT

In an image forming apparatus, a sensor section which the printed sheets fed from an image forming section pass through or by in a first direction one by one, irradiates each of the passing printed sheets with light elongated in a second direction different, thereby sensing densities of the each of passing printed sheets, on a pixel basis. Further, a control section integrates densities of respectively corresponding line portions in respective non-image areas of sheets of the printed sheets, based on the densities obtained by the sensor section, each of the line portion extending substantially in the first direction and including pixels on substantially a same position in the second direction, thereby obtaining integrated density values, and predicts, based on the obtained integrated density values, that a noise will occur on a printed sheet to be made by the image forming section later on.

14 Claims, 17 Drawing Sheets

IMAGE FORMING APPARATUS AND IMAGE NOISE PREDICTION METHOD

This application claims benefit of priority to Japanese Patent Application No. 2013-170149 filed Aug. 20, 2013, the content of which is incorporated herein by reference.

BACKGROUND OF THE INVENTION

1. Technical Field

The present invention relates to an image forming apparatus that obtains a density value of a non-image area of a printed sheet and predicts, based on the density value, occurrence of a noise on a printed sheet to be made later on, and an image noise prediction method.

2. Description of Related Art

Various methods for detecting a noise on a printed sheet have been suggested, and an example of such methods is disclosed by Japanese Patent Laid-Open Publication No. 2011-137895. In an image forming apparatus disclosed by Japanese Patent Laid-Open Publication No. 2011-137895, an image reader reads a test image formed on a recording medium (that is, a printed sheet), and a divider divides the read image into divisions based on the average density of each pixel array in a sub-scanning (or a main-scanning) direction of the read image such that average-density variations among the pixel arrays in each of the divisions are within a predetermined density range. A white void detector sets a threshold for detection of a white void for each of the divisions and judges whether there is a white void (i.e., noise) in each of the divisions with reference to the threshold for each of the divisions.

In an image forming apparatus, it sometimes happens that, during a continuous printing operation, a noise that is almost invisible on an earlier printed sheet becomes visible on a later printed sheet. In a conventional noise detection method, however, existence or non-existence of a noise is determined only based on a result of a test conducted on a test image formed on one sheet, and therefore, it is difficult to predict a noise at the time of occurrence of a latent noise.

SUMMARY OF THE INVENTION

It is an object of the present invention to provide an image forming apparatus that is capable of predicting a possible noise and a noise prediction method.

According to an aspect of the present invention, an image forming apparatus comprising: an image forming section configured to make and feed printed sheets sequentially; a sensor section which the printed sheets fed from the image forming section pass through or by in a first direction one by one, configured to irradiate each of the passing printed sheets with light elongated in a second direction different from the first direction, thereby sensing densities of the each of passing printed sheets, on a pixel basis; and a control section configured to integrate densities of respectively corresponding line portions in respective non-image areas of M sheets of the printed sheets, where M is a natural number equal to or more than two, based on the densities obtained by the sensor section, each of the line portion extending substantially in the first direction and including pixels on substantially a same position in the second direction, thereby obtaining integrated density values, and to predict, based on the obtained integrated density values, that a noise will occur on a printed sheet to be made by the image forming section later on.

According to another aspect of the present invention, an image noise prediction method applicable to an image forming apparatus including an image forming section configured to make and feed printed sheets sequentially, and a sensor section which the printed sheets fed from the image forming section pass through or by in a first direction one by one, configured to irradiate each of the passing printed sheets with light elongated in a second direction different from the first direction, thereby sensing densities of the each of passing printed sheets, on a pixel basis, the image noise prediction method comprising: integrating densities of respectively corresponding line portions in respective non-image areas of M sheets of the printed sheets, where M is a natural number equal to or more than two, based on the densities obtained by the sensor section, each of the line portion extending substantially in the first direction and including pixels on substantially a same position in the second direction, thereby obtaining integrated density values; and predicting, based on the obtained integrated density value, that a noise will occur on a printed sheet to be made by the image forming section later on.

DETAILED DESCRIPTION OF THE PREFERRED EMBODIMENTS

Figure 1A:
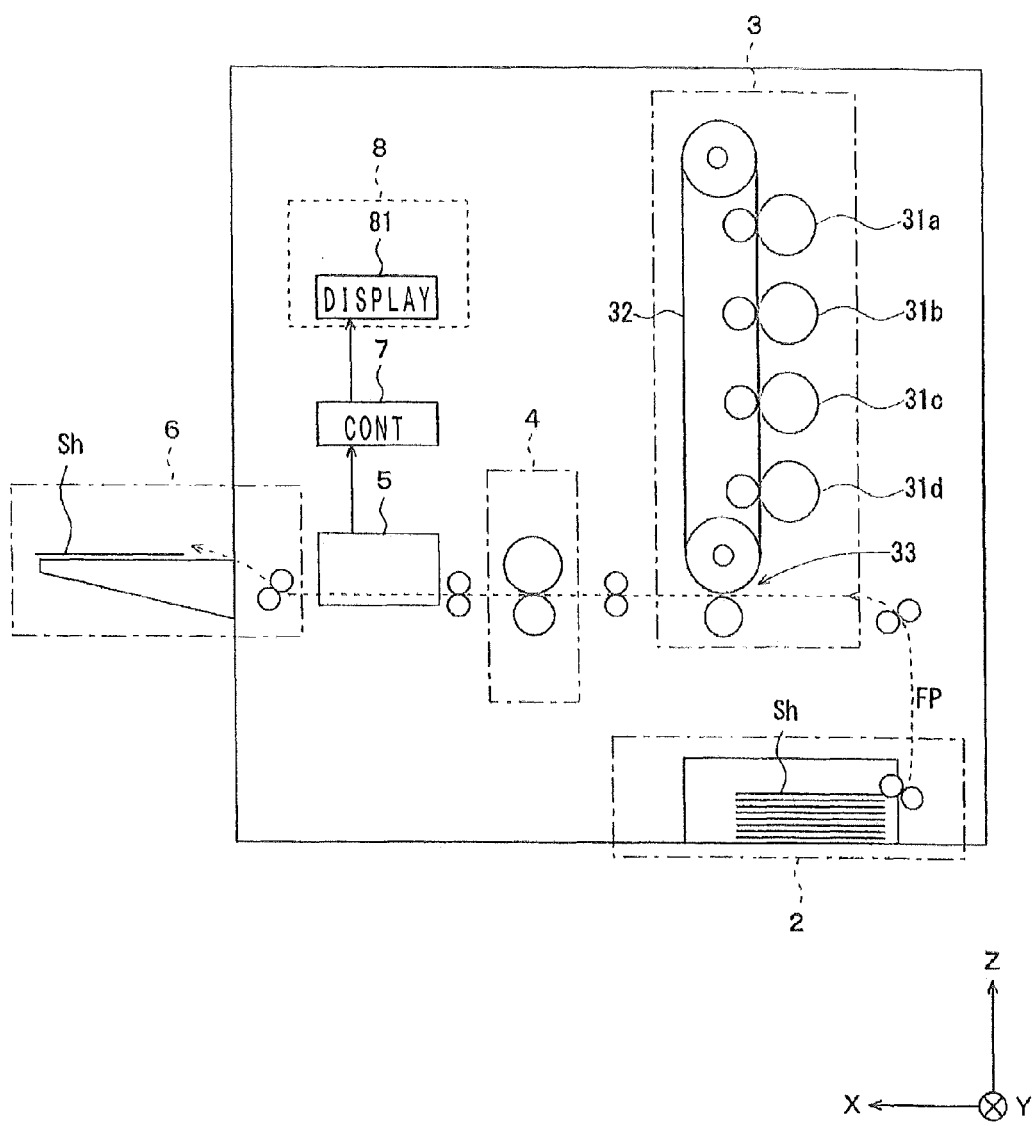
FIG. 1A shows a structure of an image forming apparatus according to an embodiment of the present invention.

An image forming apparatus and an image noise prediction method according to an embodiment of the present invention are hereinafter described with reference to the drawings.

Introduction

First, the X-axis, Y-axis and Z-axis in the drawings are described. The X-axis, Y-axis and Z-axis are perpendicular to one another. For convenience of description, the X-axis shows a first direction (which is also referred to as a sheet feeding direction) in which a sheet passes through or by an image reading area where an inline sensor section 5 reads an image of the sheet. The Y-axis shows a second direction (which is also referred to as a main-scanning direction) in which a linear beam of light emitted from the inline sensor 5 extends. The Z-axis shows a vertical (up-down) direction of the image forming apparatus 1.

In the following descriptions of the embodiments, lower-case characters a, b, c and d suffixed to reference numbers mean yellow (Y), magenta (M), cyan (C) and black (B), respectively. For example, a photoreceptor drum 31a means a photoreceptor drum 31 used for formation of a yellow image.

Structure and Operation of the Image Forming Apparatus

Referring to FIG. 1A, the image forming apparatus 1 is, for example, a copying machine, a printer, a facsimile or a multi-function peripheral having these functions. The image forming apparatus 1 prints a full-color image on a sheet Sh (for example, a paper sheet or an OHP film) by, for example, an electrophotographic and tandem method. The image forming apparatus 1 generally comprises a sheet feed section 2, an image forming section 3, a fixing device 4, an inline sensor section 5, a printed-sheet tray 6, and a control section 7.

In the sheet feed section 2, a plurality of sheets Sh are stacked. The sheet feed section 2 picks up one sheet from the stack of sheets and feeds the sheet into a sheet path (which will be referred to as sheet path FP) shown by the broken line.

In the image forming section 3, while photoreceptor drums 31a through 31d are rotating, peripheral surfaces of the photoreceptor drums 31a through 31d are charged by charging devices (not shown) for the respective colors. The charged surfaces of the photoreceptor drums 31a through 31d are exposed to light beams for the respective colors by an exposure device (not shown). Through the charging and exposure steps, electrostatic latent images for Y, M, C and Bk images are formed on the peripheral surfaces of the photoreceptor drums 31a through 31d, respectively.

In the image forming section 3, further, developing devices for the respective colors (not shown) supply toner to the respectively corresponding photoreceptor drums 31a through 31d carrying the electrostatic latent images for the respective colors. Through this developing step, toner images in the colors of Y, M, C and Bk are formed on the photoreceptor drums 31a through 31d, respectively.

In the image forming section 3, further, the toner images in the respective colors are transferred sequentially into the same area of an intermediate transfer belt 32 (primary transfer). By this primary transfer, a full-color composite toner image is formed on the intermediate transfer belt 32. The composite toner image is carried to a secondary transfer area 33 by the intermediate transfer belt 32.

Meanwhile, the sheet Sh fed from the sheet feed section 2 is conveyed in the sheet path FP to the secondary transfer area 33. In the secondary transfer area 33, the composite toner image is transferred from the intermediate transfer belt 33 to the sheet Sh (secondary transfer). After the secondary transfer, the sheet Sh is fed toward the fixing device 4 as a sheet with an unfixed image.

The fixing device 4 typically comprises a two rotating bodies that are pressed against each other to form a fixing nip portion. To the sheet Sh having an unfixed image and fed into the fixing nip portion, one of the rotating bodies of the fixing device 4 applies heat, and the other rotating body applies pressure. Through this fixing step, the unfixed composite image on the sheet Sh is fixed to the sheet Sh. After the fixing step, the sheet Sh is fed from the fixing device 4 to the sensor section 5 located downstream in the sheet path FP as a printed sheet Sh.

The sensor section 5 senses the densities of the printed sheet Sh fed thereto, on a pixel basis, and outputs them to the control section 7. After the sensing, the sensor section 5 feeds the printed sheet Sh downstream in the sheet path FP. The printed sheet Sh is finally ejected onto the printed-sheet tray 6.

The control section 7 comprises a microcomputer, a main memory, a non-volatile memory, etc. The control section 7 controls the above-described printing process by operating in accordance with a program stored in the non-volatile memory. The control section 7 processes the densities received from the sensor section 5 and predicts occurrence of a stripe noise on a printed sheet Sh to be made in the image forming section 3. The stripe noise is a noise (more specifically, a higher-density portion than the other image portions) seen on a printed sheet Sh so as to extend in the sheet feeding direction. The method of predicting the noise will be described later.

Figure 1B:
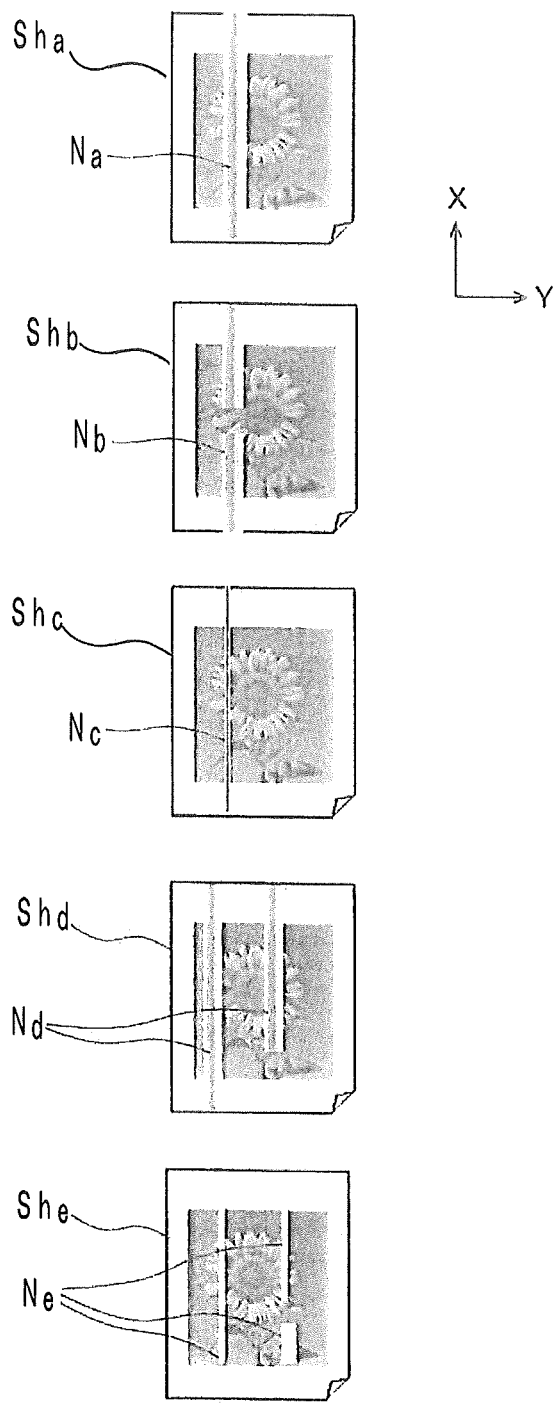
FIG. 1B shows typical examples of stripes noises on printed sheets shown in FIG. 1A.

Now, specific examples of stripe noises are described. FIG. 1B shows five kinds of stripe noises $N_a$ through $N_e$ seen on five printed sheets $Sh_a$ through $Sh_e$. The stripe noise $N_a$ extends across the printed sheet $Sh_a$ wholly in the sheet feeding direction. The stripe noise $N_b$ extends across the printed sheet $Sh_b$ from the front edge to the rear edge in the sheet feeding direction but is discontinued in the intermediate portion. The noise $N_c$, as the noise $N_a$, extends across the sheet $Sh_c$ wholly in the sheet feeding direction, but the noise $N_c$ is narrower than the noise $N_a$. On the sheet $Sh_d$, two parallel stripe noises $N_d$ extending in the sheet feeding direction are seen. On the sheet $Sh_e$, a plurality of white stripe noises $N_e$ are seen.

The output section 8 comprises, for example, a display device 81. The display device 81 displays a prediction result output from the control section 7 and gives notice to a user of the image forming apparatus 1.

Detailed Description of the Inline Sensor Section

Figure 2:
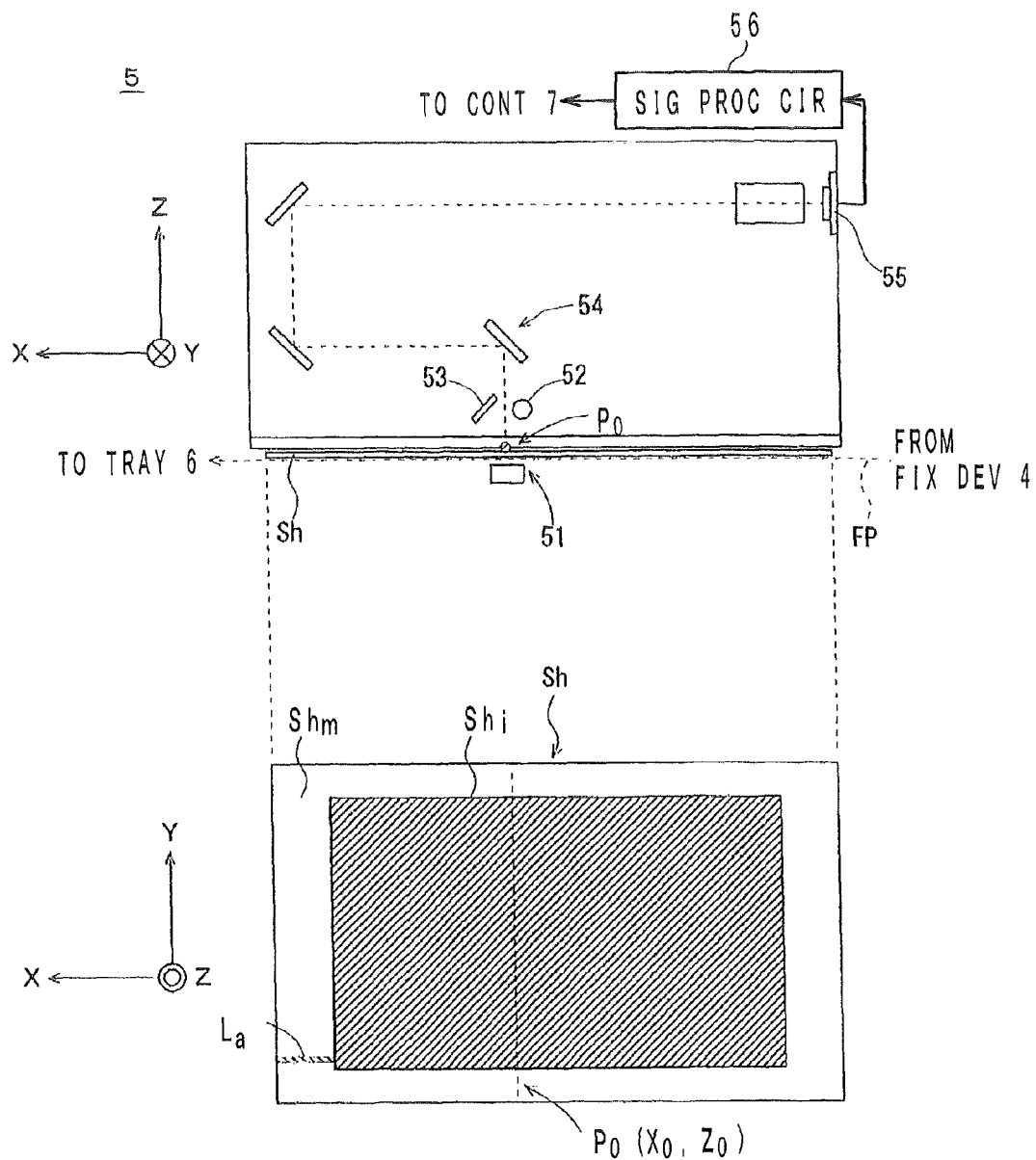
FIG. 2 shows a detailed structure of an inline sensor section shown in FIG. 1A.

As shown by FIG. 2, the sensor section 5 comprises a guide 51, a light source 52, a reflector 53, a focusing optical system 54, a light-receiving section 55, and a signal processing circuit 56.

The guide 51 is a member to define the sheet path FP. The sheet Sh is fed from the fixing device 4 to the guide 51. The guide 51 feeds the sheet Sh downstream in the sheet path FP to the printed-sheet tray 6 while guiding the sheet Sh to a position, for example, substantially parallel to an XY plane. In the part of the sheet path FP defined by the guide 51, an irradiation position $P_0$ is preliminarily set. The irradiation position $P_0$ is a linear position defined by an X-axis position of $X_0$ and a Z-axis position of $Z_0$, and the irradiation position $P_0$ extends across the printed sheet Sh in the Y-direction.

The light source 52 is arranged to extend substantially in parallel to the irradiation position $P_0$, that is, to extend in the main-scanning direction. The light source 52 emits a linear beam of light such that the linear beam of light directly enters the irradiation position $P_0$ diagonally from the negative X-direction. The light source 52 also emits a linear beam of light to the reflector 53 such that the linear beam of light enters the irradiation position $P_0$ via the reflector 53 diagonally from the positive X-direction.

The focusing optical system 54 comprises a mirror, a lens, etc. The focusing optical system 54 focuses light reflected by the sheet Sh passing through the guide 51 on the light-receiving section 55.

The light-receiving section 55 comprises photoelectric conversion elements linearly arranged in the Y-direction, for example, a CCD (charge coupled device). The light-receiving section 55 has resolution of 600 dpi with respect to the Y-direction. The light-receiving section 55, at every scanning cycle, generates analog information showing densities of one main-scanning line of the printed sheet Sh passing through or by the irradiation position $P_0$ in the sheet feeding direction, on a pixel basis. The light-receiving section 55 may be a monochromatic sensor or alternatively a color sensor, for example, an RGB sensor. When an RGB color sensor is used as the light-receiving section 55, the densities with respect to the colors R, G and B may be converted into densities with respect to the colors Y, M C and Bk by the subsequent signal processing circuit 56 or the like.

The signal processing circuit 56 converts the analog information generated by the light-receiving section 55 into digital information and outputs the digital information to the control section 7 sequentially.

Noise Prediction Method

As a functional block for image noise prediction, the control section 7 comprises an extraction section 71, an integration section 72, a prediction section 73 and a notification section 74.

In the following, an image noise prediction method carried out in the image forming apparatus 1 having the above-described structure is described with reference to FIGS. 2 through 4.

In the image forming apparatus 1, the image forming section 3 and the fixing device 4 make a first printed sheet, a second printed sheet and so forth sequentially. In the meantime, the sensor section 5, at every scanning cycle, generates digital information $I_{DA}$ showing densities of pixels on one main-scanning line. The sensor section 5 repeats this action a number of times corresponding to the length of the printed sheet Sh in the sheet feeding direction, and in this way, the sensor section 5 generates digital information $I_{DA}$ showing the densities of the whole printed sheet Sh. Further, the sensor section 5 outputs the digital information $I_{DA}$ to the control section 7 (S01 in FIG. 4). In this regard, in order to show the digital information $I_{DA}$ schematically, FIG. 3 shows a first printed sheet and a second printed sheet in the frame A enclosed by alternate long and short dash line.

Figure 3:
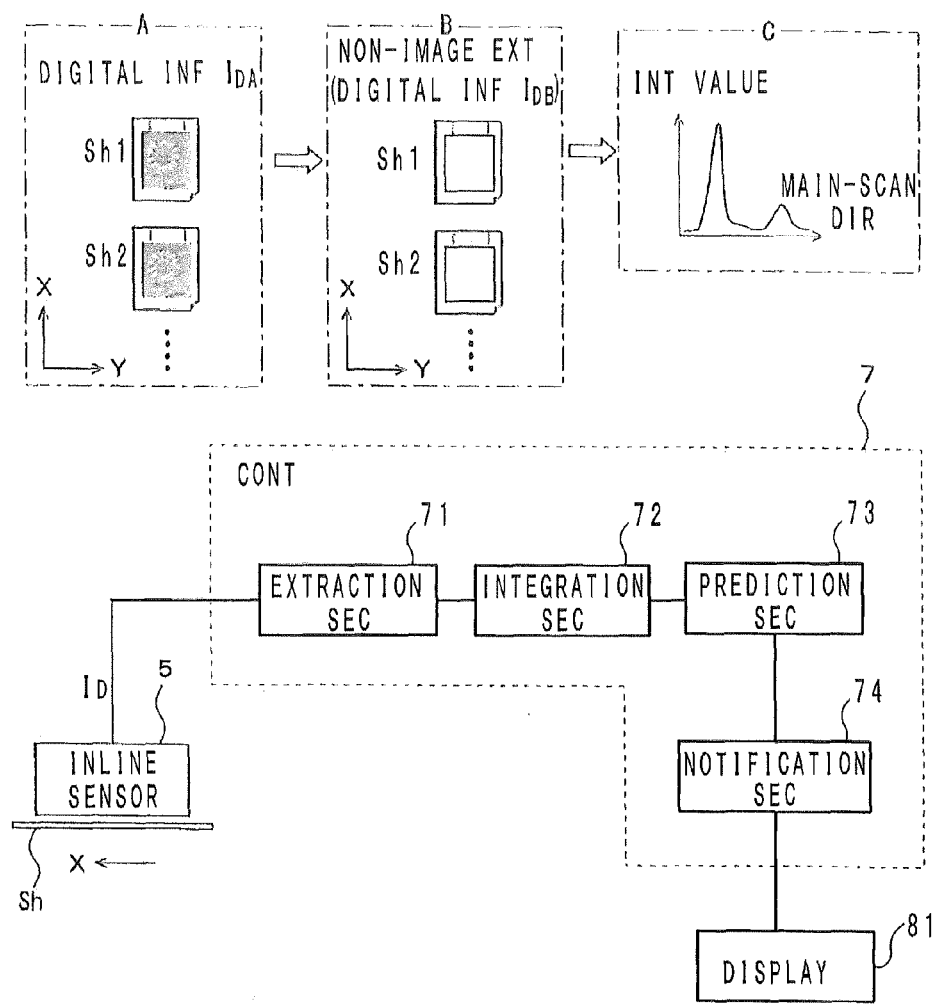
FIG. 3 is a functional block diagram of a control section shown in FIG. 1A.
Figure 4:
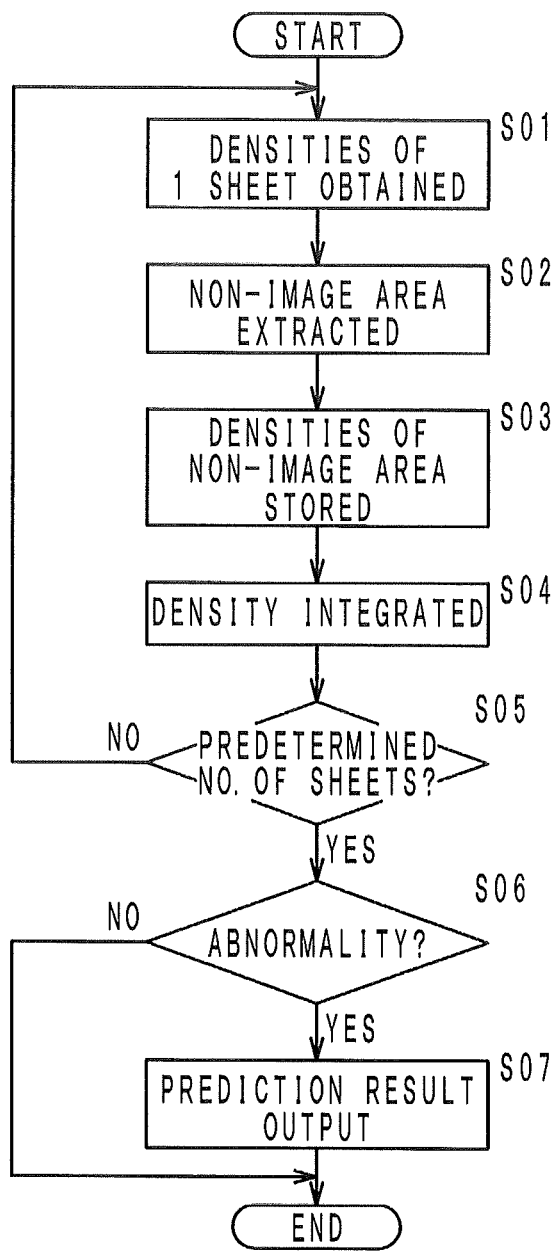
FIG. 4 is a flowchart showing a process carried out by the image forming apparatus shown by FIG. 1A.

In the control section 7, the extraction section 71 extracts information on a non-image area in one printed sheet Sh from the digital information $I_{DA}$ on the whole printed sheet Sh output from the sensor section 5 (S02 in FIG. 4). Here, the non-image area is typically a margin $Sh_m$, which is determined in the image forming apparatus 1, in the peripheral portion of the printed sheet Sh as shown in the lower section of FIG. 2. Alternatively, the non-image area may be a no toner portion in which no toner adheres, the no toner portion being in the image area $Sh_i$ of the sheet Sh. Also, the non-image area may be a combination of the margin $Sh_m$ and the no toner portion in the image area $Sh_i$. FIG. 3 schematically shows, in the frame B enclosed by alternate long and short dash line, digital information $I_{DB}$ on the non-image area extracted from the digital information $I_{DA}$ on the whole two sheets shown in the frame A.

The extraction section 71 stores, in the main memory, the extracted digital information $I_{DB}$ on the non-image area, that is, the densities of pixels in the non-image area (S03 in FIG. 4). In the non-image area, a portion composed of pixels at substantially the same positions in the second direction (that is, the main-scanning direction) and extending substantially in the first direction (that is, the sheet feeding direction) is hereinafter referred to as a line portion. In the lower section of FIG. 2, a portion La is shown as an example of the line portion.

The integration section 72 integrates densities in the line portions in the non-image area extracted by the extraction section 71 from the densities in one sheet with integrated density values of the respectively same line portions of previously-printed sheets (S04 in FIG. 4). FIG. 3 shows, in the frame C enclosed by alternate long and short dash line, an example of integrated density values of positions in the second direction.

Next, the prediction section 73 judges whether the density integration of a predetermined number of sheets has been completed (S05 in FIG. 4). Here, the predetermined number is equal to or more than M (M is a natural number equal to or more than 2). The predetermined number may be two or more that is less than or equal to the number of sheets to be made in one printing job or may be the total number of sheets to be made in a plurality of printing jobs.

If the prediction section 73 judges "No" at step S0S, the process is returned to step S01. Then, the process from steps S01 through S04 is performed on the next sheet. If the prediction section 73 judges "Yes" at step S05, the prediction section 73 performs abnormality detection (S06 in FIG. 4). At this step, specifically, the integrated density value of the predetermined number of sheets with regard to each line portion is compared with a reference value. The reference value is a reference used to judge whether there is a latent stripe noise in each line portion. The reference value is in advance determined from a test or the like conducted by the manufacturer of the image forming apparatus 1, and are stored in the program. As a result of the comparison, if there is a line portion having an integrated value beyond the reference value, the notification section 74 gives a notice of a prediction result on the display device 81 or the like to notify that a stripe noise will occur on a printed sheet Sh if the printing operation is continued (S07 in FIG. 4). On the other hand, if there is no line portion having an integrated value beyond the reference value, the notification section 74 skips step S07, and the process shown by FIG. 4 is completed.

Operation and Effects

Figure 5:
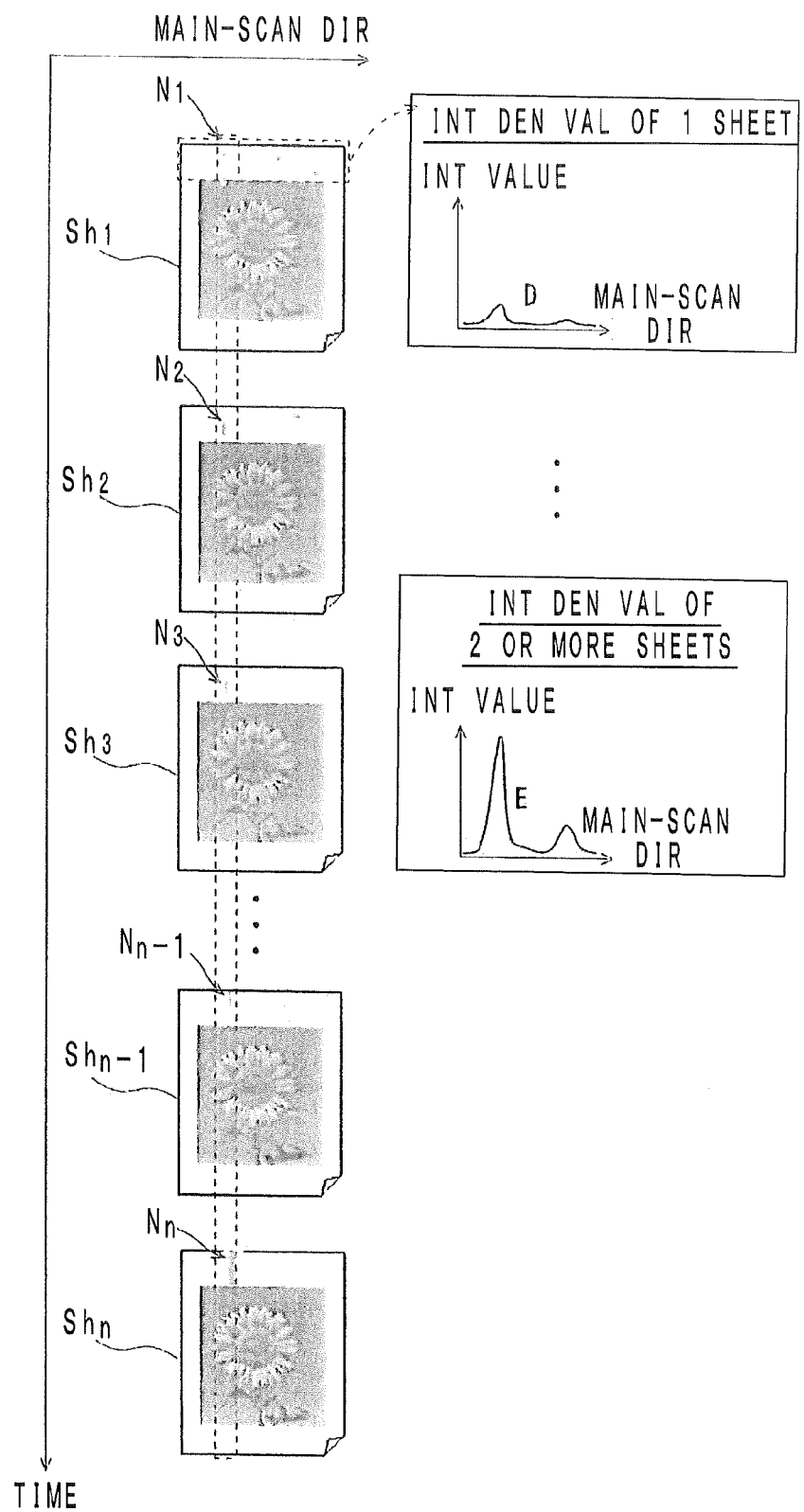
FIG. 5 shows changes of stripe noises with time during a continuous printing operation.

As described above, there is a possibility that an invisible latent stripe noise $N_1$ occurs on a printed sheet $Sh_1$ formed at a certain time during a continuous printing operation as shown by FIG. 5. The stripe noise $N_1$, in many cases, occurs in a certain line portion at low density discontinuously. On later printed sheets, for example, on printed sheets $Sh_2$ and $Sh_2$, noises $N_2$ and $N_3$ with different densities may occur in the same line portion as the noise $N_1$ but in different places from the noise $N_1$. As the printing operation proceeds, a visible stripe noise $N_n$ occurs on a further later printed sheet $Sh_n$.

In a conventional noise detection method, the latent stripe noises $N_1$ through $N_3$ cannot be detected, and during a continuous printing operation, a strip noise cannot be detected until the visible noise $Sh_n$ occurs on the later printed sheet $Sh_n$.

In the image forming apparatus 1, however, the density values of the same line portions of M printed sheets $Sh_1$, $Sh_2$ ... are integrated together. In this integration process, the density values of low-density stripe noises and the density values of discontinuously occurring stripe noises in the same line portions of a plurality of sheets are integrated. Accordingly, although the curve showing the integrated density values of one printed sheet $Sh_1$ with a latent stripe noise $N_1$ thereon does not have a prominent peak (see curve D), the curve showing the integrated density values obtained by performing the integration process on the M printed sheets $Sh_1$, $Sh_2$, ... has a prominent peak in the position where a latent stripe noise occurs (see curve E). In the other line portions where no stripe noise occurs, noises occur at random. Such random noises are actually indicated by small values clearly distinctive from the integrated density value showing a stripe noise.

In the image forming apparatus 1, the above-described integration process is carried out, and a line portion having a latent stripe noise is specified by using a reference value, and it is determined that a visible stripe noise will occur in the line portion. Thus, in the image forming apparatus 1, occurrence of a stripe noise is predictable before a visible stripe noise occurs on a printed sheet Sh.

First Modification

Figure 6:
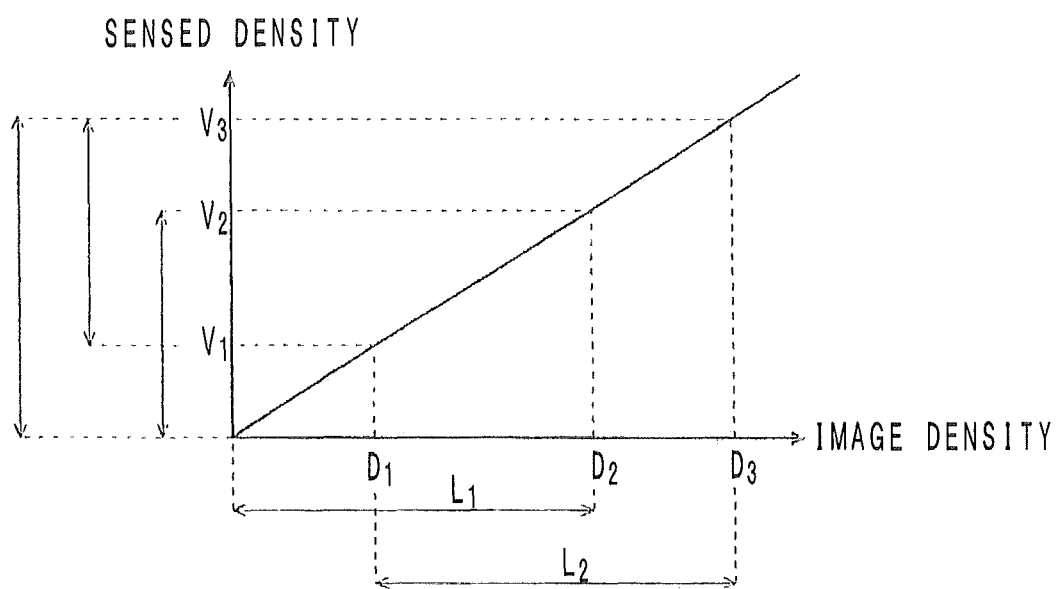
FIG. 6 is a graph showing densities obtained by the inline sensor shown in FIG. 1A relative to the quantity of light emitted from the inline sensor.

In the embodiment above, in order to generate the digital information $I_{DA}$, the sensor section 5 irradiates one main-scanning line of a printed sheet Sh with a fixed quantity of light. Depending on the kind of the sensor section 5, as shown by FIG. 6, there may be a case where irradiation of a quantity of light $L_2$ is suited for detection of low-density portions of a printed sheet Sh, and irradiation of a different quantity of light $L_2$ is suited for detection of high-density portions of the printed sheet Sh. When the sensor section 5 has a narrow latitude, it is preferred that the quantity of light emitted from the sensor section 5 is set to a proper value for the purpose. For example, when the sensor section 5 is used for a test of the print condition, the sensor section 5 needs to be sensitive to a low-density area and a high-density area. However, when the sensor section 5 is used for detection of almost invisible very low-density stripe noises, the sensor section 5 needs to be highly sensitive to a low-density area. Here, as shown by FIG. 6, the low-density area means an area of which density is within a range of 0 to $D_2$, and the high-density area means an area of which density is within a range of $D_1$ to $D_3$. The values $D_1$, $D_2$ and $D_3$ have the following relations: $0<D_1<D_2$ and $D_2<D_3$.

In the case above, the sensor section 5 irradiates each main-scanning line of a printed sheet Sh with a quantity of light $L_2$ to generate first digital information $I_{DA1}$ and thereafter with a quantity of light $L_2$ to generate second digital information $I_{DA2}$. The first digital information $I_{DA1}$ is composed of the sensed density not less than zero and not more than $V_2$, and the second digital information $I_{DA2}$ is composed of the sensed density not less than $V_1$ and not more than $V_3$. The values $V_1$, $V_2$ and $V_3$ have the following relations: $0<V_1<V_2$ and $V_2<V_3$.

Figure 7:
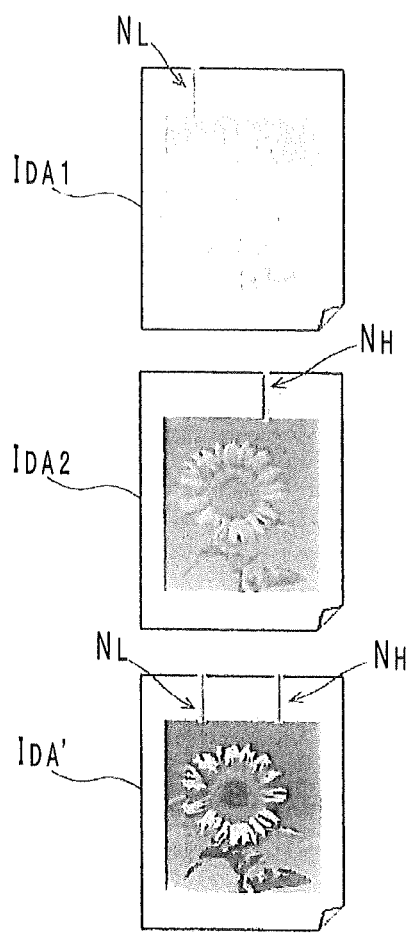
FIG. 7 is an illustration showing composite digital information.

The signal processing circuit 56 may be configured to combine the digital information $I_{DA1}$ and $I_{DA2}$ to generate composite digital information $I_{DA}'$ composed of density values not less than zero and not more than $V_3$ and to output the composite digital information $I_{DA}'$ to the control section 7. The control section 7 carries out the process shown by FIG. 4 based on the composite digital information $I_{DA}'$, and thereby, the apparent measurable density range can be widened. Thus, as shown by FIG. 7, by using the composite digital information $I_{DA}'$, it becomes possible to accurately detect both a line portion having a latent low-density stripe noise $N_L$ and a line portion having a latent high-density stripe noise $N_H$. In a case where the sensor section 5 is used also to test the print condition of the image forming apparatus 1, the sensor section 5 can sense the densities of high-density pixels accurately. In the following, a first through third configuration examples of the sensor section 5 capable of generating the composite digital information $I_{DA}'$ are described.

First Configuration Example

Figure 8A:
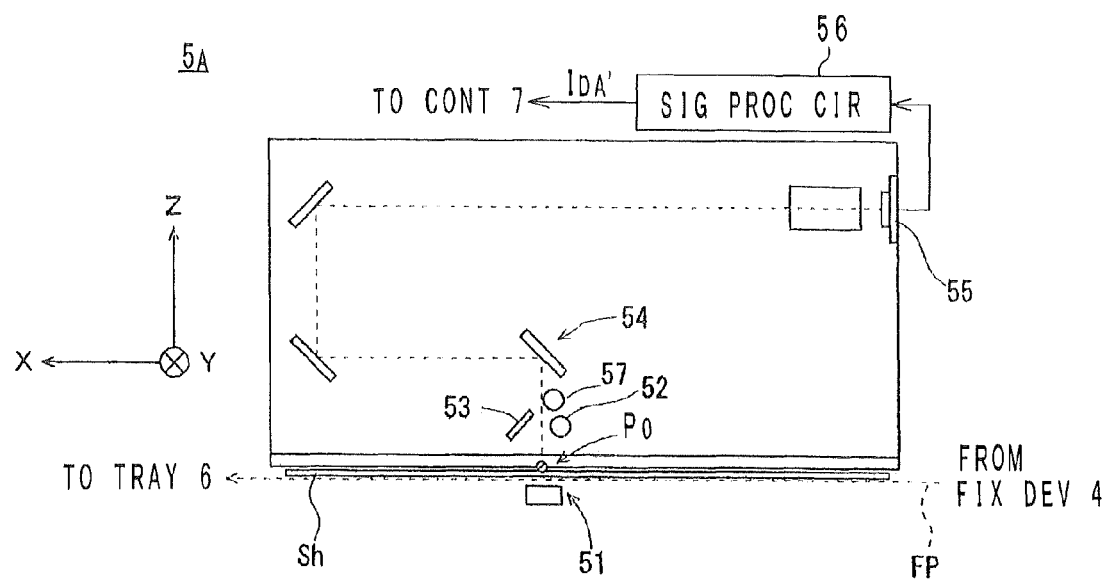
FIG. 8A shows a detailed structure of a first configuration example of an inline sensor section according to a first modification.

A sensor section $5_A$ according to a first configuration example is, as shown in FIG. 8, different from the sensor section 5 in that the sensor section $5_A$ further comprises a light-quantity adjusting light source 57 near the light source 52. There is no other difference between the sensor section 5 and the sensor section $5_A$. Therefore, in FIG. 8A, the members corresponding to the members shown in FIG. 2 are provided with the same reference symbols as shown in FIG. 2, and descriptions of these members are omitted.

The control section 7 stops the printed sheet Sh on condition that it does not affect the productivity (that is, the number of printed sheets made per a unit time) of the image forming apparatus 1. The sensor section $5_A$ irradiates the stopped printed sheet Sh at the irradiation position $P_0$ twice. At the first time of irradiation, only the light source 52 emits light, and the light-receiving section 55 outputs first analog information. At the second time of irradiation, both of the light sources 52 and 57 emit light, and the light-receiving section 55 outputs second analog information. The signal processing circuit 56 generates digital information $I_{DA1}$ and $I_{DA2}$ from the first and second analog information respectively (see FIG. 7), and thereafter generates composite digital information $I_{DA}'$.

Second Configuration Example

Figure 8B:
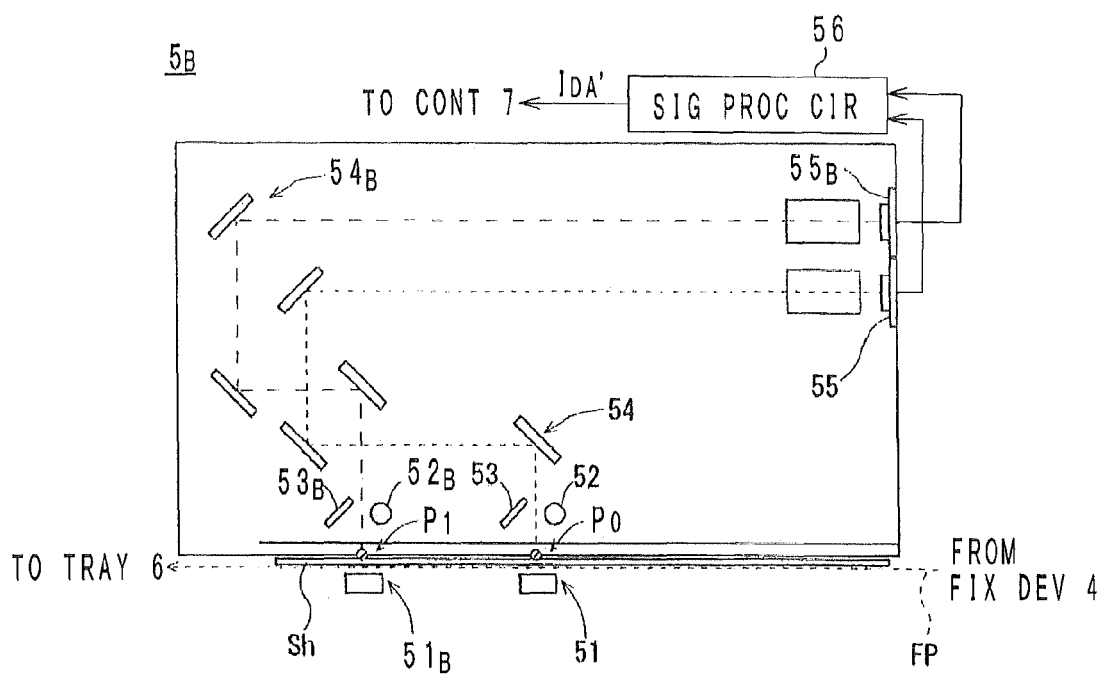
FIG. 8B shows a detailed structure of a second configuration example of the inline sensor section according to the first modification.

A sensor section $5_B$ according to a second configuration example is, as shown by FIG. 8B, different from the sensor section 5 in that the sensor section $5_B$ further comprises a guide $51_B$, a light source $52_B$, a reflector $53_B$, a focusing optical system $54_B$, and a light-receiving section $55_B$. There is no other difference between the sensor section 5 and the sensor section $5_B$. Therefore, in FIG. 8B, the members corresponding to the members shown in FIG. 2 are provided with the same reference symbols as shown in FIG. 2, and descriptions of these members are omitted.

As the guide 51 is, the guide $51_B$ is a member to define the sheet path FP. The guide 51 feeds the sheet Sh downstream in the sheet path FP to the printed-sheet tray 6 while guiding the sheet Sh to a position, for example, substantially parallel to an XY plane. In the part of the sheet path FP defined by the guide $51_B$, an irradiation position $P_1$ is preliminarily set separately from the irradiation position $P_0$. The irradiation position $P_1$ is a linear position located on an X-axis position of $X_1$ and a Y-axis position of $Z_1$, and the irradiation position $P_1$ extends across the printed sheet Sh in the Y-direction.

The light source $52_B$ is arranged to extend substantially in parallel to the irradiation position $P_1$, that is, to extend in the main-scanning direction. The light source $52_B$ emits a linear beam of light such that the linear beam of light directly enters the irradiation position $P_1$ diagonally from the negative X-direction. The quantity of light emitted from the light source $52_B$ is larger than the quantity of light emitted from the light source 52. The light source $52_B$ also emits a linear beam of light to the reflector $53_B$ such that the linear beam of light enters the irradiation position $P_1$ via the reflector $53_B$ diagonally from the positive X-direction.

The focusing optical system $54_B$ comprises a mirror, a lens, etc. The focusing optical system $54_B$ focuses light reflected by the sheet Sh passing through the guide $51_B$ on the light-receiving section $55_B$.

The light-receiving section $55_B$ comprises linearly arranged photoelectric conversion elements. The light-receiving section $55_B$, at every scanning cycle, generates analog information showing densities of one main-scanning line of the printed sheet Sh passing through the irradiation position $P_1$ in the sheet feeding direction.

The signal processing circuit 56 converts the analog information on the same main-scanning line generated by the light-receiving sections 55 and $55_B$ into digital information $I_{DA1}$ and $I_{DA2}$ (see FIG. 7) and generates a composite digital information $I_{DA}{}'$. Then, the signal processing circuit 56 outputs the composite digital information $I_{DA}{}'$ to the control section 7 sequentially.

Third Configuration Example

Figure 8C:
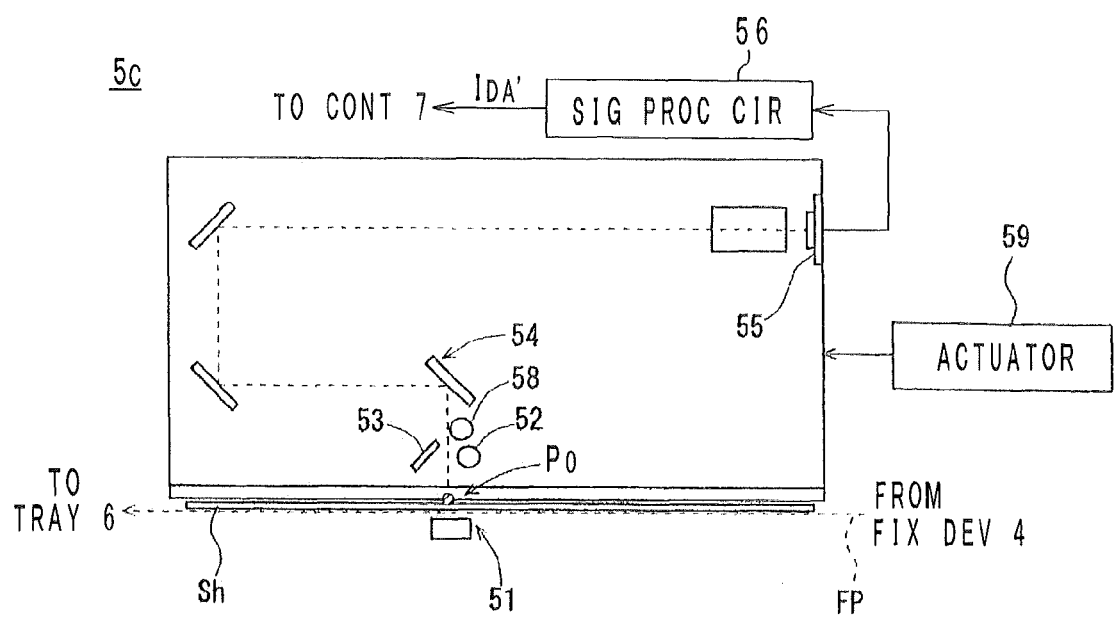
FIG. 8C shows a detailed structure of a third configuration example of the inline sensor section according to the first modification.

A sensor section $5_C$ according to a third configuration example is, as shown by FIG. 8C, different from the sensor section 5 in that the sensor section $5_C$ further comprises a light-quantity adjusting light source 58 located near the light source 52 and an actuator 59. There is no other difference between the sensor section 5 and the sensor section Sc. Therefore, in FIG. 8C, the members corresponding to the members shown in FIG. 2 are provided with the same reference symbols as shown in FIG. 2, and descriptions of these members are omitted.

The control section 7 drives the actuator 59, thereby vibrating the main part of the sensor section 5, which is, more particularly, the optical system extending from the light source 52 to the light-emitting section 55, in the positive and negative X-directions. The optical system moves in the positive X-direction at substantially the same speed as the printed sheet Sh.

The sensor section $5_C$ irradiates the sheet Sh which has a relative speed of 0 (that is, which is stationary relative to the sensor section 5c), at the irradiation position $P_0$ twice. At the first time of irradiation, only the light source 52 emits light, and the light-receiving section 55 outputs first analog information. At the second time of irradiation, both of the light sources 52 and 58 emit light, and the light-receiving section 55 outputs second analog information. The signal processing circuit 56 generates digital information $I_{DA1}$ and $I_{DA2}$ from the first and second analog information respectively (see FIG. 7), and thereafter generates composite digital information $I_{DA}{}'$.

Second Modification

In the embodiment above, the control section 7 integrates the respective densities of pixels on a plurality of printed sheets Sh at the same position in the main-scanning direction (see frame C of FIG. 3). However, a stripe noise does not necessarily occurs at the same position in the main-scanning direction on a plurality of printed sheets, and as shown in the left side of FIG. 9, a stripe noise may occur at slightly different positions g in the main-scanning direction on a plurality of printed sheets. In such a case, as shown by the graph in the left side of FIG. 9, the curve F has a plurality of peaks, and it may take time for the peaks to reach the reference value. This means that it takes time for the control section 7 to detect a latent stripe noise.

Figure 9:
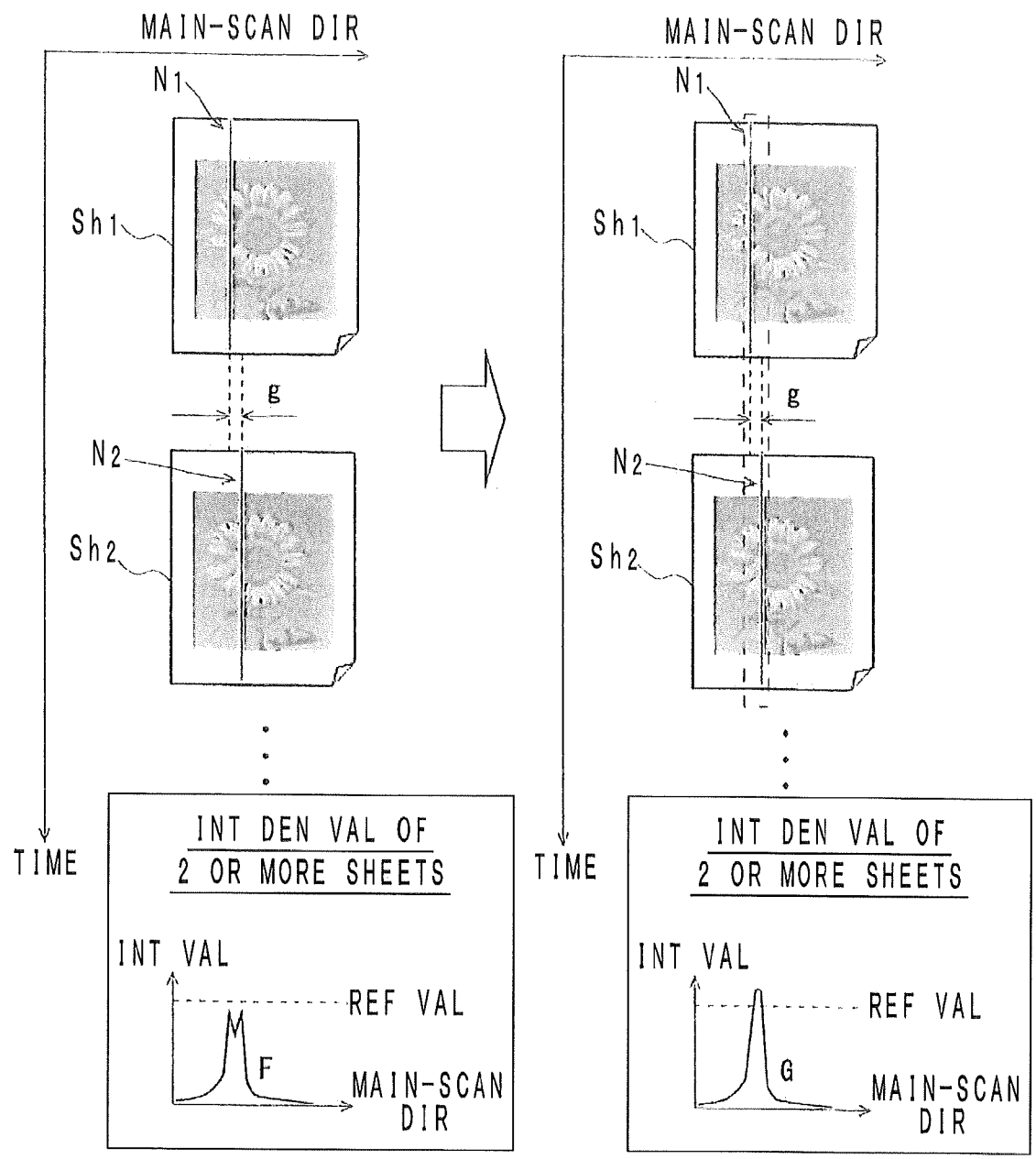
FIG. 9 is an illustration showing a process carried out by an image forming apparatus according to a second modification.

In order to avoid the problem, it is preferred that the width (the size in the main-scanning direction) of each line portion is increased from one pixel to a plurality of pixels as shown by the right side of FIG. 9. The control section 7 integrates the densities of the pixels in the widened line portion. Consequently, as shown by the graph in the right side of FIG. 9, it becomes more likely that the curve G has a single peak in the line portion having a latent stripe noise. Thus, the control section 7 can detect a latent stripe noise soon.

Third Modification

Figure 10:
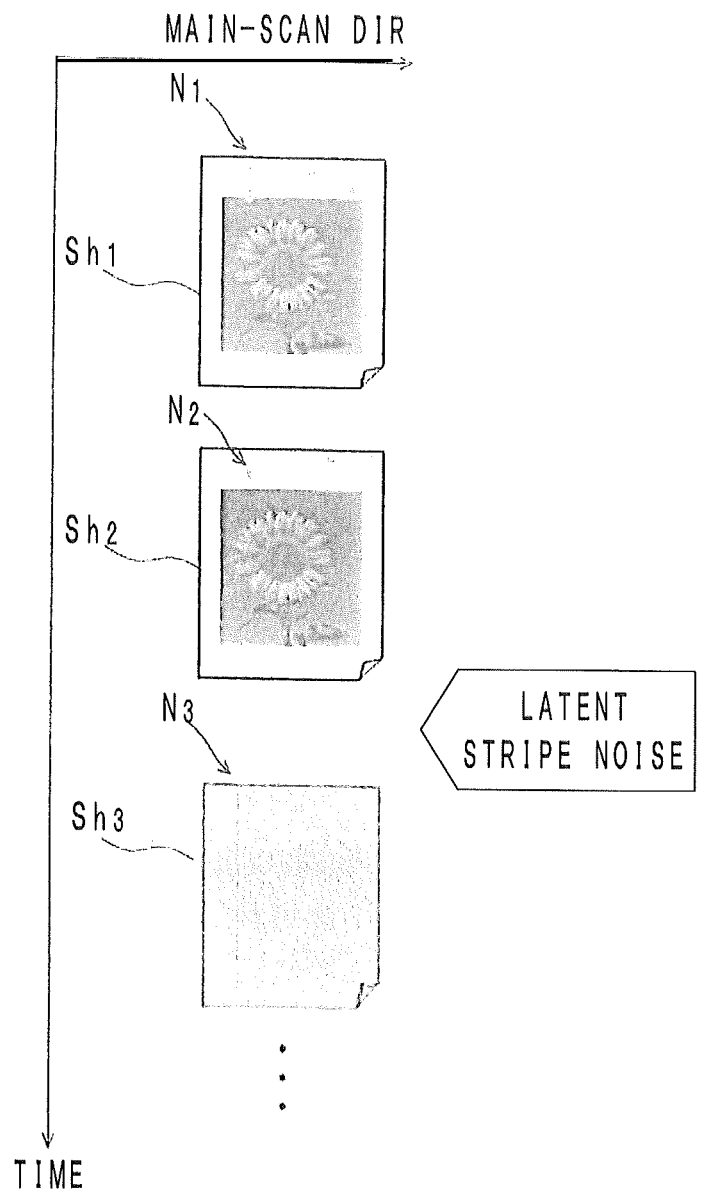
FIG. 10 is an illustration showing a process carried out by an image forming apparatus according to a third modification.

In the embodiment above, the control section 7 displays a prediction result on the display device 81, thereby giving a notice to a user. However, the method of giving notice of a prediction result is not limited to this method. For example, if the control section 7 judges "Yes" at step S06 in FIG. 4, the control section 7 may control the image forming apparatus 1 so as to form and eject a printed sheet Sh having an image with a substantially uniform density as shown by FIG. 10. The printed sheet Sh having an image with a substantially uniform is, for example, a sheet having a unicolor halftone image or a blank sheet.

Fourth Modification

Figure 11:
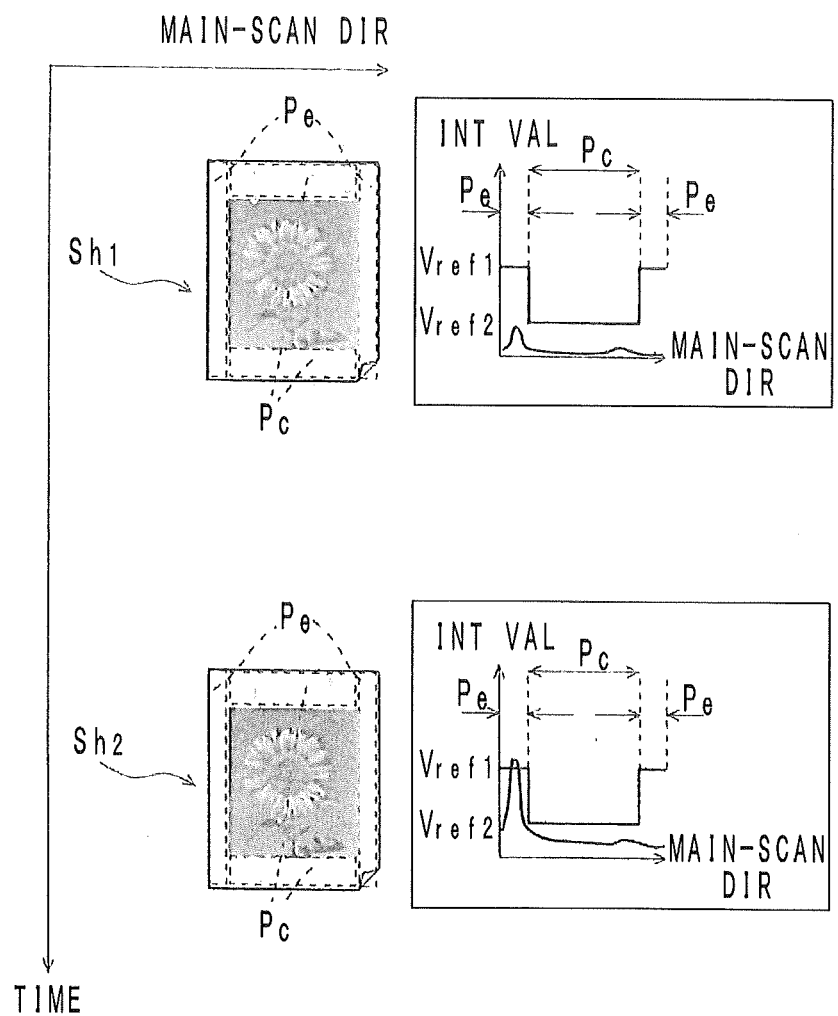
FIG. 11 is an illustration showing reference values used in an image forming apparatus according to a fourth modification.

As is apparent from FIG. 2, the length (the size in the sheet feeding direction) of the margin $Sh_m$ of the printed sheet Sh at both end portions in the main-scanning direction is greater than the length at other portions (at intermediate portions). Therefore, the number of pixels (the volume of information) of each sheet Sh used for prediction of a stripe noise in each of the end portions is relatively great. If a latent stripe noise occurs in either of the end portions, such a latent stripe noise is visually recognized by the user, readily. For this reason, as indicated at step S06 in FIG. 4, it is not appropriate to use a fixed single reference value for the entire in the main-scanning direction, and different reference values may be used for different portions in the main-scanning direction as shown by FIG. 11. In this modification, the reference value includes a first reference value $V_{ref1}$ and a second reference value $V_{ref2}$ smaller than the first reference value $V_{ref1}$. The relatively large first reference value $V_{ref1}$ is used to be compared with the integrated density values in the both end portions $P_e$ of a predetermined number of sheets. The second reference value $V_{ref2}$ is used to be compared with the integrated density value in the center portions $P_c$ of the predetermined number of sheets.

Fifth Modification

In a fifth modification, as in the fourth modification, the reference value includes a first reference value to be compared with the integrated density values in the both end portions $P_e$ of a predetermined number of sheets and a second reference value to be compared with the integrated density values in the center portions $P_c$ of the predetermined number of sheets, and the first reference value is greater than the second reference value.

Figure 12:
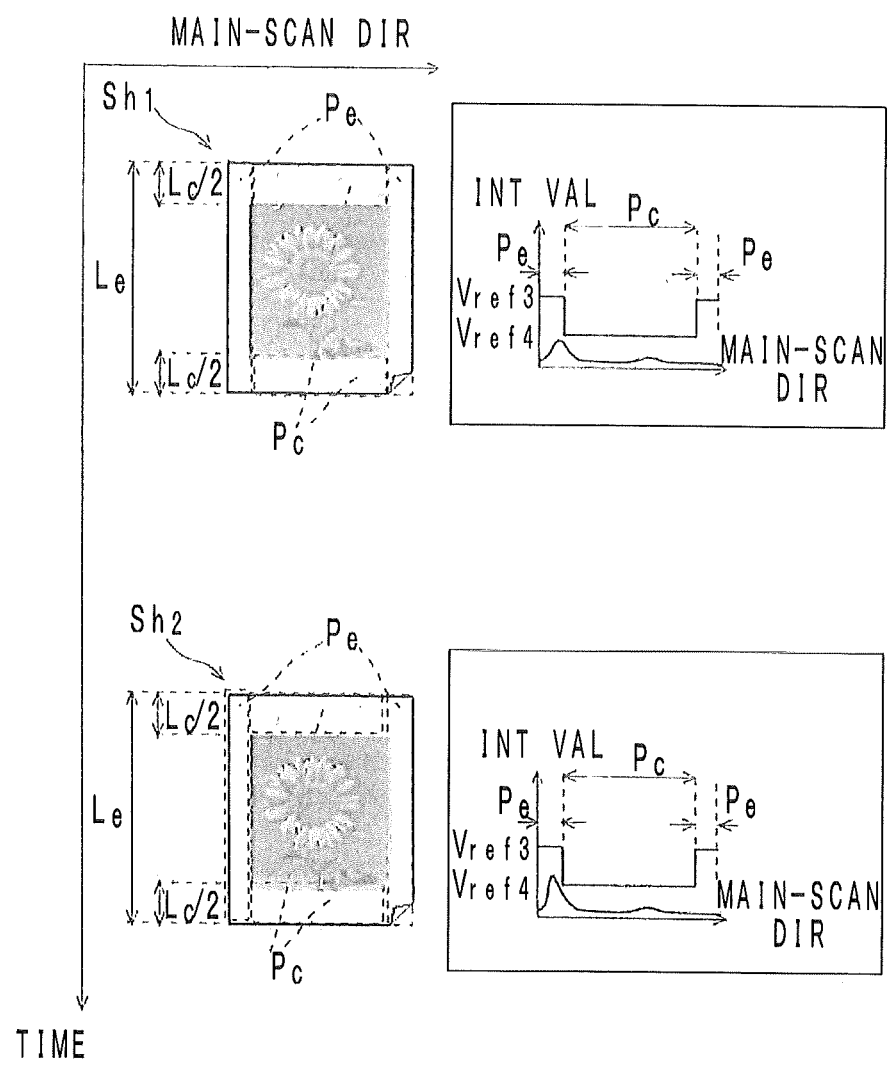
FIG. 12 is an illustration showing reference values used in an image forming apparatus according to a fourth embodiment.

More specifically, as shown by FIG. 12, in the fifth modification, the first reference value is denoted by $V_{ref3}$ and the second reference value is denoted by $V_{ref4}$. The length (the size in the sheet feeding direction) of the both end portions $P_e$ is denoted by $L_e$, and the length (the size in the sheet feeding direction) of the center portion $P_e$ is denoted by $L_c$. Then, the reference values $V_{ref3}$ and $V_{ref4}$ are set to meet the condition of $V_{ref4}/V_{ref3}=L_c/L_e$. By using these reference values $V_{ref3}$ and $V_{ref4}$, the time it takes for the control section 7 to predict occurrence of a strip noise becomes constant whether the stripe noise occurs in any of the end portions $P_e$ or the center portions $P_C$.

Sixth Modification

According to the inventors' knowledge, when the image forming apparatus 1 is a color machine as described above, a stripe noise is attributed to a blot on the peripheral surface of the secondary transfer roller. When the image forming apparatus 1 is a monochromatic machine, a stripe noise may be caused by residual toner remaining on the surface of the photoreceptor drum after the primary transfer. As shown in Table 1 below, there are also other possible causes of a stripe noise. Stripe noises are divided into thick stripe noises (for example, having widths more than 1 mm) and thin stripe noises (for example, having widths less than or equal to 1 mm) as shown in Table 1.

TABLE 1

| | | | | Strip Noise | |
| --- | --- | --- | --- | --- | --- |
| | | | | Thick | Thin |
| Causes | Color Machine | Secondary transfer | Cleaning (Secondary transfer belt, Intermediate transfer belt) | — | — |
| | | | Secondary transfer area | Blot on transfer roller | — |
| | Monochromatic Machine | Primary transfer | Cleaning (Photoreceptor drum) | — | Residual toner on Photoreceptor drum |
| | | | Primary transfer area | Blot on transfer roller | — |
| | | Development | Developing device | Fusion of toner on developing roller | — |
| | | Photoreceptor drum | | Scratch on surface | Contact of neutralizing cloth with foreign object |
| | | Charging | Pin, Wire | Toner blot on pin/wire | — |
| | | | Grid | Toner blot on grid | — |

Figure 13:
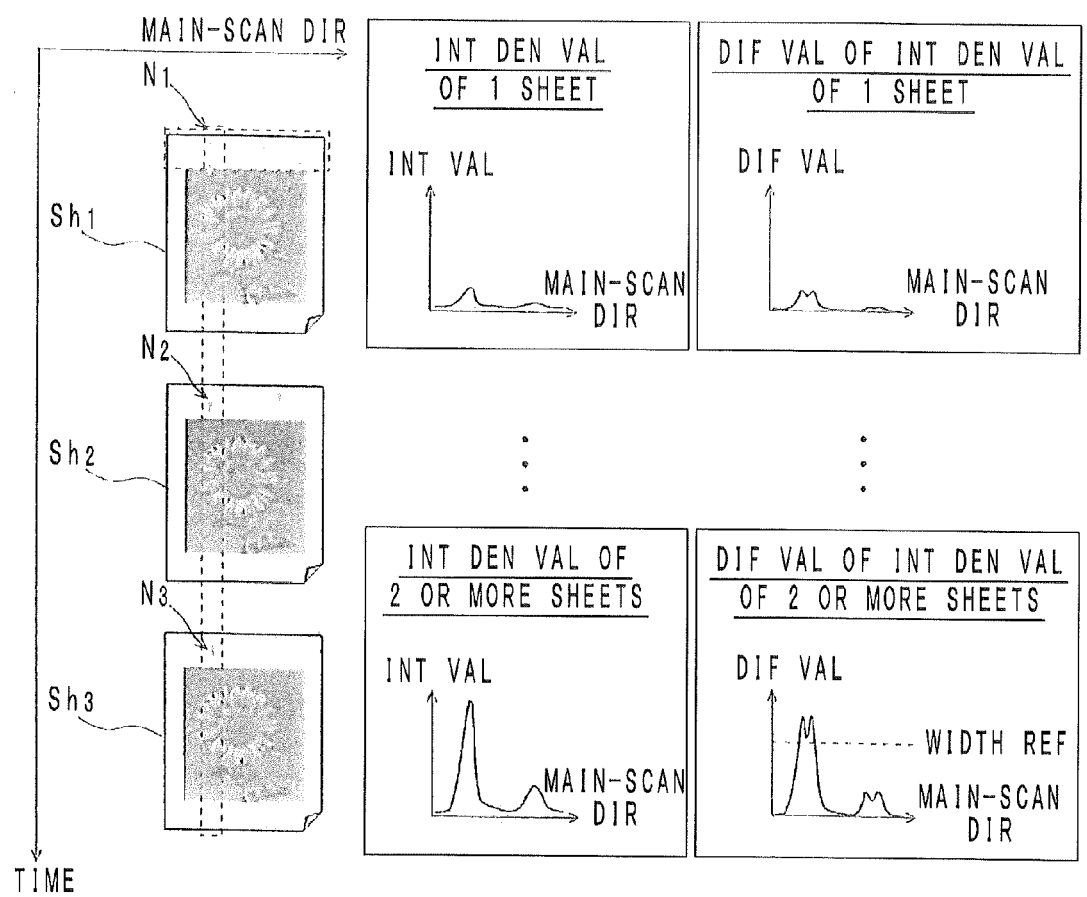
FIG. 13 is an illustration showing a process carried out by an image forming apparatus according to a sixth modification.

At step S06 in FIG. 4, a line portion having an integrated density value equal to or more than the reference value is detected. At this step S06, there is a case where a single line portion is judged to have a stripe noise (thin stripe noise) and a case where a plurality of line portions is judged to have a stripe noise (thick stripe noise). In order to calculate the width (size in the main-scanning direction) of a stripe noise predicted to occur, as shown by FIG. 13, the control section 7 calculates, for example, absolute values of differential values of the integrated density values to the main-scanning direction (the amount of change with respect to the Y-direction) of the detected line portion and the surrounding line portions. The control section 7 stores a reference value (a width reference value) used for detection of the width of a stripe noise. If the calculated absolute values of the differential values are more than the reference value, the control section 7 predicts occurrence of a thin stripe noise. If the calculated absolute values of the differential values are less than or equal to the reference value, the control section 7 predicts occurrence of a thick stripe noise. Further, the control section 7 may presume the cause of the stripe noise based on the predicted width of the stripe noise and may display the presumed cause additionally at step S07. For example, if the control section 7 predicts occurrence of a thin stripe noise, the control section 7 presumes that toner remains on the peripheral surface of the photoreceptor drum due to defective cleaning after the primary transfer or that a foreign object contacts with the peripheral surface of the photoreceptor drum.

Seventh Modification

Figure 14:
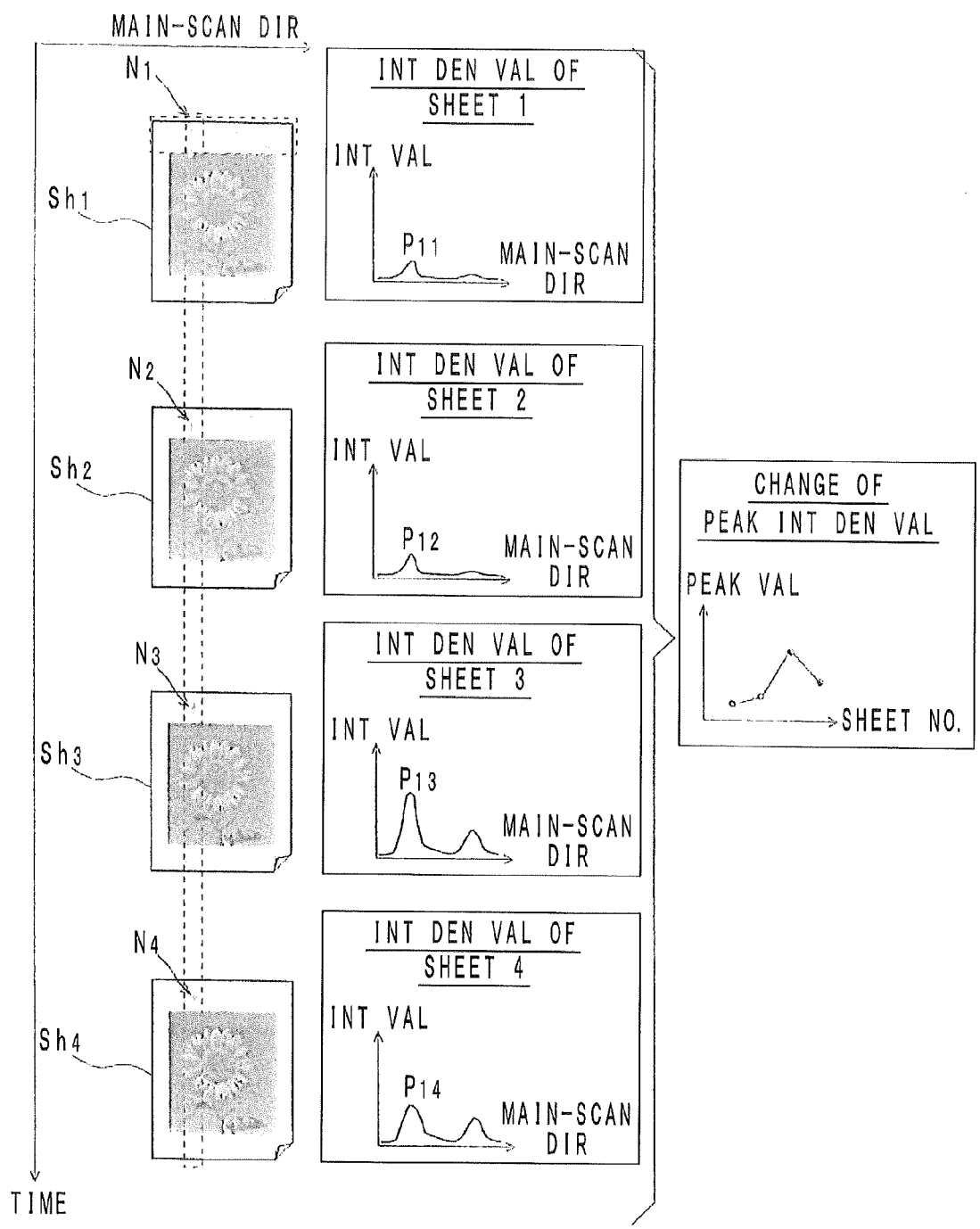
FIG. 14 is an illustration showing a process carried out by an image forming apparatus according to a seventh modification.

It is also possible to presume the cause of a stripe noise based on the pattern of changes in the integrated density value with increases in the number of printed sheets. Specifically, as shown by the right side of FIG. 14, there may be a case where at an early stage of a continuous printing operation (operation for making a first, a second, a third, a fourth, . . . printed sheets continuously), with regard to a position in the main-scanning direction, for example, as the continuous printing operation progresses from the first, second and third sheets, the respective peak integrated density values $P_{11}$, $P_{12}$ and $P_{13}$ increases suddenly, and thereafter the peak integrated density value $P_{14}$ of the fourth printed sheet decreases. In this case, it is presumed that the stripe noise occurring at the position with respect to the main-scanning direction is attributed to clogging of a cleaning blade. If the peak integrated value at a position in the main-scanning direction monotonically increases with increases in the number of printed sheets, it is presumed that the stripe noise occurring at the position is attributed to a blot on the charging device.

In order to presume the cause of a stripe noise in this manner, immediately after step S04, that is, every time integration of density values of one sheet is completed, the control section 7 detects the peak integrated density value, and the peak integrated density values of a plurality of sheets are stored with respect to each line portion. Thereafter, if the control section 7 judges "Yes" at step S06, with respect to the line portion that has been judged to have a stripe noise, the control section 7 analyzes the pattern of changing the peak integrated density value with increases in the number of printed sheets. Then, if it is found that the peak integrated density value increased suddenly and thereafter decreased gradually, it is presumed that clogging of the cleaning blade has occurred. If it is found that the peak integrated density value increased monotonically, it is presumed that the charging device has a blot.

Eighth Modification

As described in connection with the embodiment above, the light-receiving section 55 may be an RGB color sensor. In this case, The RGB densities are converted into Y, M, C and Bk densities by the signal processing circuit 56. Thereby, the control section 7 can carry out the process shown by FIG. 4 for each color and can presume the cause of a stripe noise for each color.

Notes

In the embodiment above, the image forming section 3 forms a toner image on a sheet Sh. The image forming section 3 is not necessarily of this type, and the image forming section 3 may form an ink image on a sheet Sh.

In the embodiment above, the control section 7 notifies the user of occurrence of a stripe noise by displaying the prediction result on the display device 81. However, the control section 7 may give notice of the prediction result to the user by rendering an aural output through a speaker. The control section 7 may display the printed sheet Sh with a stripe noise occurring thereon (that is, the image picked up by the sensor section 5) on the display device 81. If the control section 7 detects a latent stripe noise, the control section 7 alternatively may make and eject a printed sheet (for example, a printed sheet with a uniform-density image) different from the printed sheets Sh ejected until then.

Also, when the image forming apparatus 3 comprises a plurality of printed-sheet trays 6, the control section 7 may change trays to which printed sheets Sh are delivered before and after detection of occurrence of a latent stripe noise.

Although the present invention has been described in connection with the preferred embodiments above, it is to be noted that various changes and modifications may be obvious to those who are skilled in the art. Such changes and modifications are to be understood as being within the scope of the present invention.

What is claimed is:

1. An image forming apparatus comprising:
   an image forming section configured to make and feed printed sheets sequentially;
   a sensor section which the printed sheets fed from the image forming section pass through or by in a first direction one by one, configured to irradiate each of the passing printed sheets with light elongated in a second direction different from the first direction, thereby sensing densities of the each of passing printed sheets, on a pixel basis; and
   a control section configured to integrate densities of respectively corresponding line portions in respective non-image areas of M sheets of the printed sheets, where M is a natural number equal to or more than two, based on the densities obtained by the sensor section, each of the line portion extending substantially in the first direction and including pixels on substantially a same position in the second direction, thereby obtaining integrated density values, and to predict, based on the obtained integrated density values, that a noise will occur on a printed sheet to be made by the image forming section later on.

2. The image forming apparatus according to claim 1, wherein the control section comprises:
   an extraction section configured to extract densities of the respective non-image areas of the M printed sheets from the densities obtained by the sensor section;
   an integration section configured to integrate densities, which are included in the densities extracted by the extraction section, of respectively corresponding line portions in the M printed sheets, thereby obtaining the integrated density values; and
   a prediction section configured to compare each of the integrated density values obtained by the integration section with a predetermined reference value and to predict, based on a comparison result, that a noise will occur on a printed sheet to be made by the image forming section later on;
   wherein the image forming apparatus further comprises a display device configured to display a prediction result output from the prediction section.

3. The image forming apparatus according to claim 1, wherein the sensor section is configured to irradiate each of the passing printed sheets with a plurality of kinds of light having different quantities of light so as to sense, on a pixel basis, the density of each of the printed sheets more than once.

4. The image forming apparatus according to claim 3,
   wherein the control section is configured to temporarily stop each of the printed sheets passing through or by the sensor section; and
   wherein the sensor section is configured to sense, on a pixel basis, the densities of each of the printed sheets more than once by irradiating each of the printed sheets temporarily stopped by the control section with the plurality of kinds of light having different quantities of light at different times.

5. The image forming apparatus according to claim 3, wherein the sensor section is configured to sense, on a pixel basis, the densities of each of the printed sheets more than once by irradiating each of the printed sheets with the plurality of kinds of light having different quantities from different positions.

6. The image forming apparatus according to claim 1, wherein the non-image area is a preset margin of each of the M printed sheets.

7. The image forming apparatus according to claim 1, wherein the non-image area includes a non-printed portion in an image area of each of the M printed sheets.

8. The image forming apparatus according to claim 1, wherein each of the line portions has a width corresponding to a plurality of pixels in the second direction.

9. The image forming apparatus according to claim 2,
   wherein the reference value includes a first reference value and a second reference value smaller than the first reference value; and
   wherein the prediction section is configured to compare the integrated density values for the respective line portions located in both end portions in the second direction of the printed sheets with the first reference value, and to compare the integrated density values for the respective line portions located between the both end portions of the printed sheets with the second reference value.

10. The image forming apparatus according to claim 2,
    wherein the reference value includes a first reference value, and a second reference value smaller than the first reference value;
    wherein, when the first reference value is denoted by $V_{ref3}$, the second reference value is denoted by $V_{ref4}$, the line portions located in the both end portions in the second direction have lengths of $L_e$, and the line portions located between the both end portions have lengths of $L_c$, the first and second reference values $V_{ref3}$ and $V_{ref4}$ are set so as to fulfill a condition of $V_{ref4}/V_{ref3}=L_c/L_e$; and wherein the prediction section is configured to compare the integrated density values for the respective line portions located in the both end portions in the second direction of the printed sheets with the first reference value, and to compare the integrated density values for the respective line portions located between the both end portions of the printed sheets with the second reference value.

11. The image forming apparatus according to claim 1, wherein the control section is configured to presume a cause of a noise based on an amount of change in the obtained integrated density value with respect to the second direction.

12. The image forming apparatus according to claim 1, wherein the control section is configured to presume a cause of a noise based on a pattern of changes in the integrated density value with increases in number of printed sheets.

13. The image forming apparatus according to claim 11, wherein the image forming section is configured to make and feed printed sheets having color images thereon sequentially; and
wherein the control section is configured to predict a cause of a noise for each color included in the color images.

14. An image noise prediction method applicable to an image forming apparatus including an image forming section configured to make and feed printed sheets sequentially, and a sensor section which the printed sheets fed from the image forming section pass through or by in a first direction one by one, configured to irradiate each of the passing printed sheets with light elongated in a second direction different from the first direction, thereby sensing densities of the each of passing printed sheets, on a pixel basis, the image noise prediction method comprising:
integrating densities of respectively corresponding line portions in respective non-image areas of M sheets of the printed sheets, where M is a natural number equal to or more than two, based on the densities obtained by the sensor section, each of the line portion extending substantially in the first direction and including pixels on substantially a same position in the second direction, thereby obtaining integrated density values; and
predicting, based on the obtained integrated density value, that a noise will occur on a printed sheet to be made by the image forming section later on.

* * * * *